No. 626,520. Patented June 6, 1899.
A. R. BEAL.
PRICE OR MONEY WEIGHT SCALE.
(Application filed Aug. 30, 1898.)
(No Model.) 2 Sheets—Sheet 1.
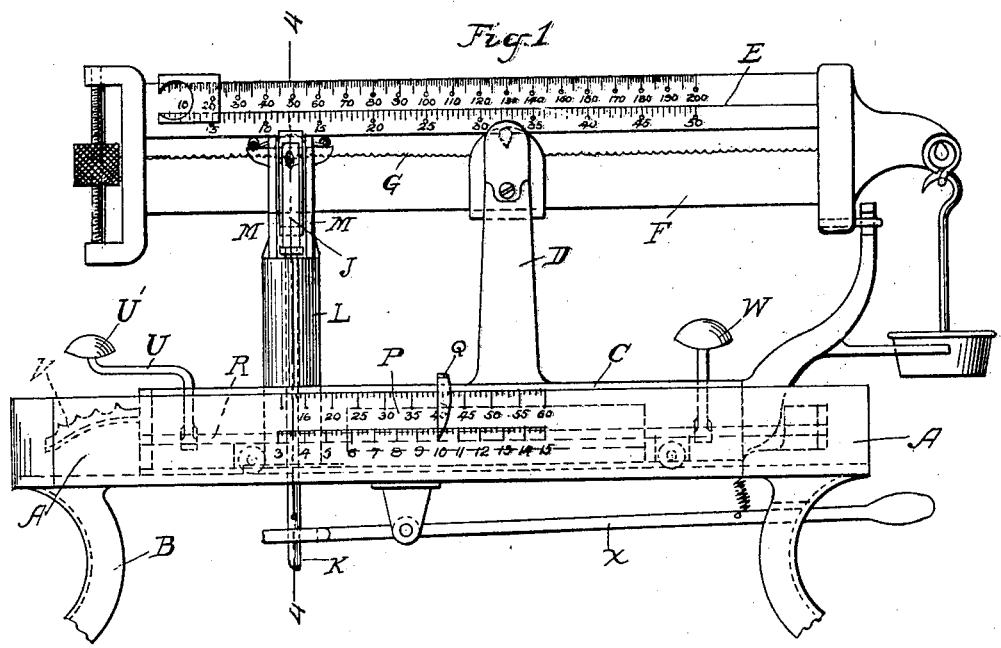
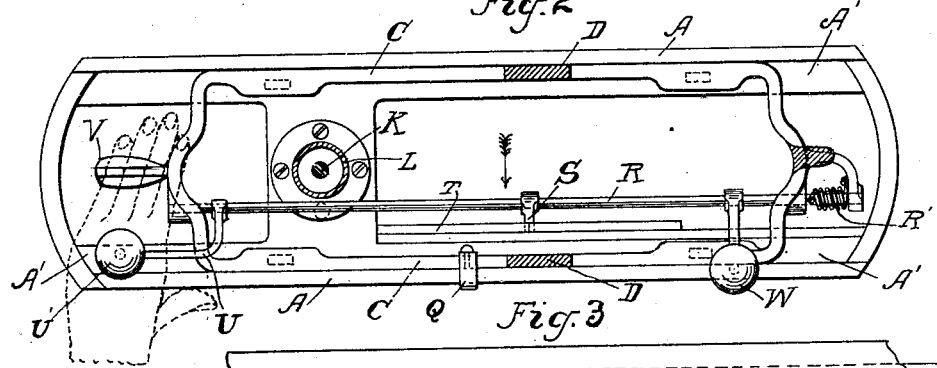
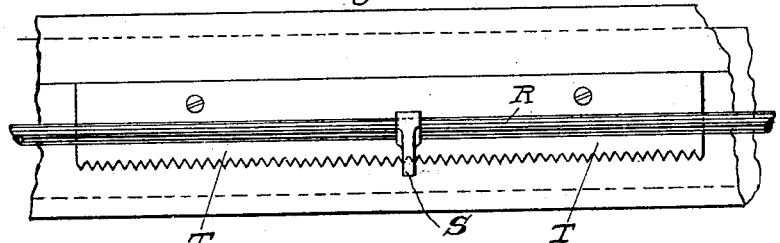
WITNESSES:
H. J. Brown
A. E. Lean
INVENTOR
A. R. Beal,
BY
J. M. Nesbit
ATTORNEY.
THE NORRIS PETERS CO., PHOTO-LITHO., WASHINGTON, D. C.

No. 626,520. Patented June 6, 1899.
A. R. BEAL.
PRICE OR MONEY WEIGHT SCALE.
(Application filed Aug. 30, 1898.)

(No Model.) 2 Sheets—Sheet 2.

WITNESSES:
W. J. Brown.
C. C. Lean

INVENTOR
A. R. Beal,
BY
J. M. Nesbit
ATTORNEY.

UNITED STATES PATENT OFFICE.

ALPHA R. BEAL, OF PITTSBURG, PENNSYLVANIA.

PRICE OR MONEY-WEIGHT SCALE.

SPECIFICATION forming part of Letters Patent No. 626,520, dated June 6, 1899.

Application filed August 30, 1898. Serial No. 689,883. (No model.)

*To all whom it may concern:*

Be it known that I, ALPHA R. BEAL, a citizen of the United States, residing at Pittsburg, in the county of Allegheny and State of Pennsylvania, have invented new and useful Improvements in Price or Money-Weight Scales, of which the following is a specification.

This invention relates to price or money-weight scales; and one object thereof is to connect the steelyard-rod and beam in such manner that the latter may be moved, as when setting the scale, without being locked to or held rigid with the carriage.

A further object of the invention is to provide an improved arrangement of price or unit indications on the base or other fixed portion of the machine, in connection with an indicator on the carriage movable over said indications, and also an improved lock for accurately holding the carriage in adjustment. One defect in scales of this character as at present constructed is that the carriage when fixed is liable to be out of correct position relative to the steelyard-rod and beam connection, and vice versa, giving to the parts when in use strained and unnatural position, and thereby impairing the very essential accuracy of the machine.

It therefore becomes a further object of the present invention to remedy the defects noted by causing the carriage and beam connection to maintain constantly relatively correct position.

Further objects of the invention are to provide improved means for shifting the carriage, to provide an improved mounting for the carriage in the machine-base, and to provide improved means for relieving the beam of the weight of a load which may be placed on the scale before the beam is set, whereby the beam is more easily adjusted to proper position.

The invention consists in the novel features of construction and in the combination and arrangement of parts hereinafter fully described and claimed, and illustrated by the accompanying drawings, in which—

Figure 4:
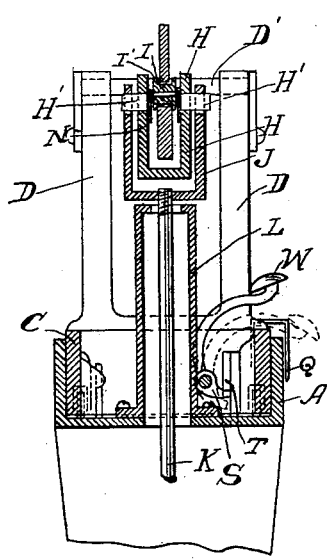
Figure 5:
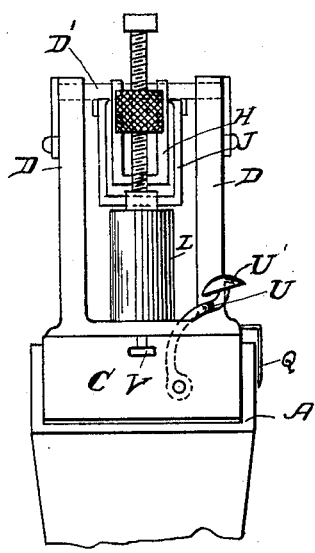
Figure 6:
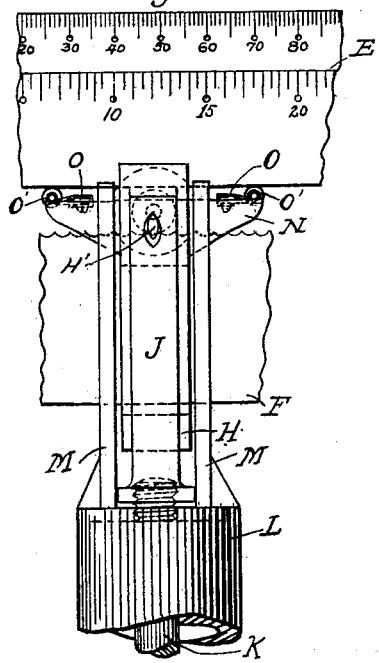
Figure 7:
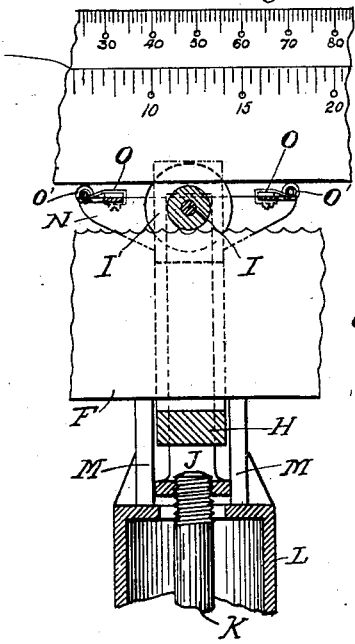
Figure 8:
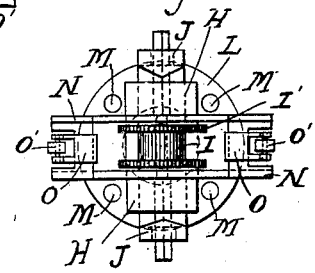

Figure 1 is a front elevation of the upper portion of a scale embodying my improvements. Fig. 2 is a sectional plan view of the supplemental base and carriage. Fig. 3 is an enlarged detail view of the carriage-locking rack, looking in the direction of the arrow, Fig. 2. Fig. 4 is a vertical cross-sectional view on line 4 4 of Fig. 1. Fig. 5 is an end view. Fig. 6 is a full-size elevation of the beam connection, showing a portion of the beam. Fig. 7 is a vertical sectional view of Fig. 6. Fig. 8 is a plan view of the beam-roller connection detached.

The platform and base being the same as those formerly used and forming no part of my invention are not here illustrated, nor is the machine here shown provided with a tare-beam, as I prefer to dispense therewith, the steelyard-rod extending directly from a counterweighted platform-lever or nose-iron, as is common in machines of this character.

Supplemental base A, supported on uprights B, is flanged on opposite sides at A' to form tracks for carriage C. Raised from the carriage are fulcrum-posts D, between which bars E and F are evenly balanced on knife-edges D'. These bars are rigidly united at the ends and constitute the balanced beam. The space between the bars forms slot G, and the bottom of this slot or the top edge of bar F is scalloped or serrated at F'. Bar F is embraced by yoke H, and journaled therein over the bar is roller I, having side flanges I'. The bar moves through the yoke and beneath the roller, and when at rest the roller drops by gravity into one of scallops F'. Yoke H is loosely mounted by means of knife-edge trunnions H' in yoke J, secured to the upper end of steelyard or load-connecting rod K. This rod extends downward through hollow post L, and the latter supports four vertical guides or stops M, two on each side of the beam. Yoke H has sufficient play between guides M to afford the roller limited vibration in the direction of the length of the beam. When the beam is moved, as when setting the scale, this play of the load-rod connecting-roller prevents frictional engagement and cramping of the coöperating parts. The horizontal play each way of yoke H between guides M is in extent approximately one-half the length of one of scallops F', so that the vibrations of the roller cannot carry it past the scallop corresponding with the carriage-locking point. It is by means of this limited vibratory movement of the roller connection that I am enabled to adjust the scale without first raising the load connection and leveling the beam, as is necessary in many forms of even-balanced scales, and by causing the roller to engage the correct beam-scallop and rendering it mechanically impossible for the same to engage any other scallop I obtain absolute accuracy. Rigid with yoke H and in line with roller I, also the beams, are arms N, carrying upwardly-pressing springs O, provided with antifriction-rollers O', and these rollers bear upward on the under edge of bar E and serve to hold the yoke normally against vertical oscillation and in perpendicular position, though the springs have not sufficient resistance to impede the movement of the beam past the roller.

It will be noted that the top plane of knife-edge trunnions H' alines with the center of the journal of roller I, so that when yoke J is pulling down on said knife-edges, as when weighing, a direct central pull is exerted on the roller, causing the same to accurately center in one of the scallops F'. It will also be noted that by the arrangement of vertical guides and mechanism for always centering the roller the steelyard or load-connecting rod is always perpendicular.

Instead of placing the price or unit indications on the lower bar of the beam—that is to say, bar F—as is now generally practiced in this class of scales, I have positioned them on the front of supplemental base A, as shown at P, and provide the carriage with pointer Q, reaching over and depending in front of the indications, where it designates the price per pound or other unit of the article weighed.

For moving and locking the carriage in the frame or base I provide shaft R, journaled longitudinally in the carriage, and arranged thereon is dog S, which engages rack-bar T, secured to the inner side of base A. Spring R' constitutes a tension for the shaft, holding dog S normally in engagement with one of the rack-bar notches. The carriage is thus unlocked and rendered capable of movement upon a partial rotation of the shaft, and this movement of the shaft is effected by depressing handle U at the left hand of the carriage. Said handle is provided, preferably, with a semispherical hold U', adapted to fit the hollow of the hand, and with the hand positioned thereon, the fingers extending over rest V on the carriage extremity with one finger upon the carriage and the thumb dropped down onto the front of base A, as seen in Fig. 2, slight pressure of the hand releases the carriage, and I have found by practical experience that the handhold just described affords the best possible control of the carriage for one hand and obviates all tendency to cramp or stick the same. A similarly-formed handle W, extending from shaft R at the opposite end of the carriage, provides for ready manipulation thereof with the right hand of the operator.

Should the scale be heavily loaded before adjusting the balance-beam, the latter may be temporarily relieved by depressing lever X, which has loose engagement with steelyard-rod K, thus raising and sustaining said rod and the load during the adjustment of the beam, in such instance the lever X being manipulated by the right hand and the carriage by the left hand of the operator.

In operation the carriage is moved until pointer Q indicates on scale P the price per pound, when shaft R is released, causing dog S to engage the notch on rack T corresponding to the price indication, and said rack being notched in unison with bar F of the beam the beam is brought to rest with the relatively proper scallop F' beneath roller I, into which the roller drops by gravity, it being impossible for the same, owing to the mechanism before described, to engage any other scallop. Thus with the price-per-pound indications corresponding exactly with the notches on locking-rack T and said indications and notches corresponding with the beam-scallops F' absolute accuracy is attained. By dropping the carriage to position within the supplemental base rather than on top thereof it becomes unnecessary to secure the carriage against vertical displacement.

As the price indications are on the base they read in the same direction as the value indications on the beam, thereby avoiding the confusion that always exists when all indications are on the beam, as now generally arranged, where the two sets of indications read necessarily in opposite directions.

I am aware that I am not the first to arrange the price-per-unit indications on the scale-frame, nor am I the first to provide a roller connection between the even-balanced beam and weighing-levers, for such arrangements, broadly stated, are shown in a patent to D. D. Allen, No. 114,278, dated May 2, 1871. By combining said principles and elements with others here shown and described I have, however, embodied their advantages in a thoroughly practical and absolutely accurate weighing-machine.

Having thus fully described my invention, what I claim as new, and desire to secure by Letters Patent, is—

1. The combination of a beam provided with evenly-spaced indentations, a load-connecting rod, a roller at the upper end of the rod adapted to engage the beam indentations, the roller having play in the direction of the length of the beam, and means for limiting the play of the roller to an extent approximately one-half the length of one of the beam indentations, substantially as shown and described.

2. The combination of a beam, a yoke, a horizontal roller journaled in the yoke and engaging the beam, trunnions projecting from opposite sides of the yoke, the top plane of the trunnions alining with the axial center of the roller for the purpose described, and a downwardly-pulling load connection mounted on said bearings.

3. The combination of an indented beam, a load-rod, a horizontally-elongated connection between the beam and rod, said connection carrying a roller for engaging the beam indentations and having horizontal pivotal union with the load-rod, said pivotal union alining horizontally with the axial center of the roller, and means for maintaining the elongated connection normally parallel with the beam, substantially as shown and described.

4. The combination of a balanced beam, a load-connecting rod, a connection between the beam and rod, said connection adapted to vibrate on a horizontal axis, and fixed vertical stops for limiting the vibration of the said connection.

5. The combination of a beam, a load-connecting rod, a loose roller connection between the beam and rod, the engagement of the load-rod with the roller connection being, when weighing, in the horizontal plane of the axial center of the roller, substantially as shown and described.

6. The combination of a base, a carriage, a balanced beam on the carriage, a vibratory load connection uniting and coöperating with the beam, and fixed guides raised from the base for limiting the vibrations of the load connection.

7. The combination of a beam, a load-connecting rod, a yoke pivotally mounted on the beam so as to oscillate vertically with relation thereto, and bearings on the yoke with which the load-rod has loose engagement, the yoke affording a loose connection between the beam and load-rod and serving to maintain the load-rod the bearings on the yoke for said rod and the yoke-pivot in a vertical plane when weighing, substantially as shown and described.

8. In a scale of the character described, the combination of a base, a carriage, carriage locking and releasing mechanism, and a depressible knob-shaped handle movable with the carriage for actuating said mechanism, the knob of the handle fitting the hollow of the operator's hand while the fingers thereof are sustained by the carriage, whereby the operator maintains perfect control over the carriage movement with one hand, substantially as shown and described.

9. The combination of a base, a carriage, carriage locking and releasing mechanism, a depressible knob-shaped handle at one end of the carriage for actuating said mechanism, and a finger-rest positioned at the carriage end inward from the handle, the knob fitting the hollow of the hand and the rest supporting the fingers thereof while adjusting the carriage.

10. In a price-scale, the combination of a frame, a beam movable thereon provided with evenly-spaced indentations, a load-connecting rod, a roller at the upper end of the rod past which the beam moves, the roller having play in the direction of the length of the beam, and stops for limiting the play of the roller to an extent approximately one-half the length of one of the beam indentations, substantially as shown and described.

In testimony whereof I have hereunto set my hand in presence of two subscribing witnesses.

ALPHA R. BEAL.

Witnesses:
J. M. NESBIT,
W. H. DODDS.